United States Patent
Posselt

[19]

[11] Patent Number: 5,992,353
[45] Date of Patent: Nov. 30, 1999

[54] METHOD FOR OPERATING AN INTERNAL COMBUSTION ENGINE AND THE LATTER ITSELF

[76] Inventor: Werner Posselt, Waldstr. 12, D-87656, Germaringen, Germany

[21] Appl. No.: 09/062,957

[22] Filed: Apr. 20, 1998

[30] Foreign Application Priority Data

May 23, 1997 [DE] Germany .............................. 197 21 573

[51] Int. Cl.⁶ .................................................. F02B 45/00
[52] U.S. Cl. ............................ 123/23; 123/25 F; 123/557
[58] Field of Search ................................ 123/25 F, 25 D, 123/3, 557, 23

[56] References Cited

U.S. PATENT DOCUMENTS

| | | | |
|---|---|---|---|
| 4,909,192 | 3/1990 | Forster et al. | ........................... 123/557 |
| 5,099,802 | 3/1992 | Forster | .................................. 123/25 D |

Primary Examiner—Noah P. Kamen
Attorney, Agent, or Firm—Notaro & Michalos P.C.

[57] ABSTRACT

A method for operating an internal combustion engine includes the steps of feeding a high-pressurize and super-heated mixture of fuel vapor and water vapor to an injection valve at a cylinder head of a combustion chamber. The mixture is pressurized to at least 350 atm and is super-heated to at least 840° F. Under these conditions at least the fuel vapor is dissociated and is converted into a mixture of organic gases having compositions which differ from the analysis of the original liquid fuel. The advantages of the method are a better fuel economy and a reduction of exhaust emissions of smoke, CO, $NO_x$. The method also enables combustion of a plurality of energy containing liquids and solid matter, especially synthetic materials. Due to the high pressure and temperature of the vapor mixture, a dissociation of the vapors into small organic basic modules, especially carburetted hydrogen gases, occurs.

4 Claims, 1 Drawing Sheet

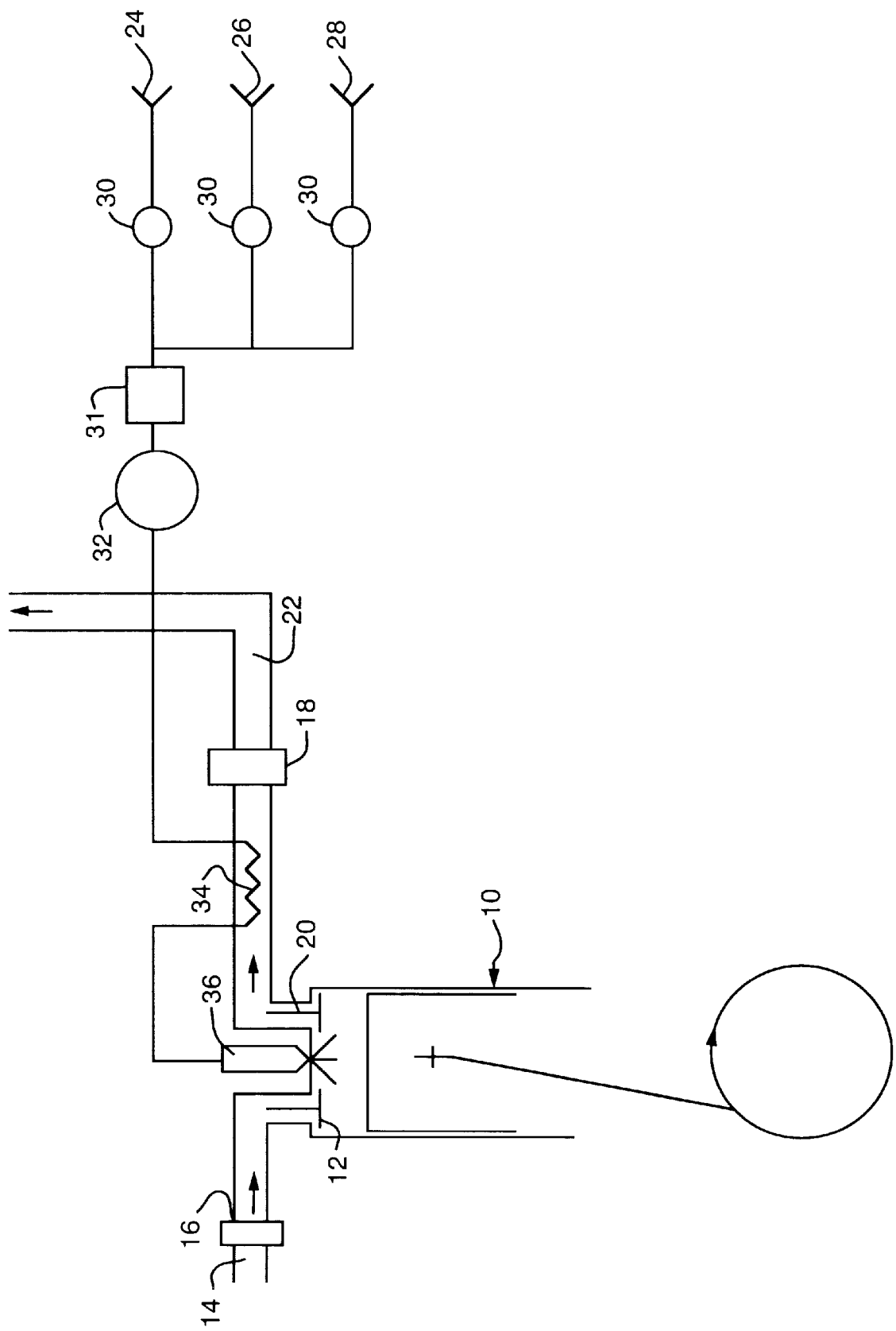

METHOD FOR OPERATING AN INTERNAL COMBUSTION ENGINE AND THE LATTER ITSELF

BACKGROUND OF THE INVENTION AND PRIOR ART

The invention relates to a method for operating an internal combustion engine comprising at least one combustion chamber, air inlet and gas exhaust valves and an injection valve by which an overheated and pressurized mixture, consisting of fuel vapor and water vapor is injected into the combustion chamber and wherein heating of the mixture is effected by hot exhaust gas leaving the engine.

A method of this kind is known from German patent reference DE 37 34 346-A. According to this method a pump for pressure elevation of the liquid fuel and a second pump for the water is proposed and the mixture is evaporated at a pressure above the maximum compression pressure. The fuel-vapor-water-vapor-mixture is fed to the injection valve at a temperature of substantially 430° F. This reference gives us information on the absolute pressure level of the fuel-vapor-water-vapor-mixture.

German patent reference DE 39 24 013-A describes a similar method, which differs from the aforementioned method, because the pressure of the fuel-vapor-water-vapor-mixture is smaller than the maximum compression pressure in the cylinder at maximum power. In this reference the pumps for water and liquid fuel are designed so that the pressure for entering the evaporator is adjustable between 5 and 20 atm.

The purpose of both references is to create a method to inject fuel vapor and water vapor into an internal combustion engine at the same time to have available the fuel already in vaporized state when it is injected into the combustion chamber and to receive a homogeneous explosive mixture after mixing it with combustion air. It is well known in the art, that water vapor can reduce noxious gaseous components especially $NO_x$ or smoke particles in the exhaust gas and that the specific fuel consumption can be reduced thereby.

In German reference DE 42 18 104 A it is proposed, to inject over-heated water at a temperature of 700° F. and about 223 atm into the combustion chamber of an internal combustion engine during the expansion cycle. However, the water is not mixed with the fuel, is not pressurized and is not evaporated.

Last but not least a proposal is known, where water and fuel are injected alternately into the combustion chamber during consecutive work phases. This affords two injection valves. The goal is to reach an improved $NO_x$-binding with condensed water. Proposals such as the aforementioned are described in German references DE 35 17 177-A and DE 31 43 605-A. The problem of operating a combustion engine with spark ignition with a compressed fuel-vapor-water-vapor-mixture is the increasing knock tendency due to auto-ignition. According to German reference DE 40 35 064-A it is proposed to oppose this tendency by cooling the fuel-vapor-water-vapor-mixture before injection to condense at least a part of the fuel vapor and also the water vapor. This suggestion reduces the thermal efficiency of the combustion engine.

All known proposals trace the same goal to reduce exhaust emissions, especially smoke particles, NO or CO by adding atomized water or water vapor. During injection of the fuel-vapor-water-vapor-mixture just-those pressures and temperatures were allowed, which lead to superheating of the vapor mixture, but still hold the knock tendency of the engine within allowed limits.

SUMMARY OF THE INVENTION

One object of the invention is to improve a method of the aforementioned kind so that the thermal efficiency of the combustion engine is furthermore improved and also the advantage of reducing the noxious matter emission in the exhaust gas is maintained.

A further object of the invention is to provide a method for operating an internal combustion engine comprising at least one combustion chamber, air inlet and gas exhaust valves and an injection valve, in which method an overheated and pressurized mixture, consisting of fuel vapor and water vapor is injected into the combustion chamber and wherein heating of the mixture is effected by hot exhaust gas leaving the engine. A further object is characterized in that the mixture is held at a pressure of at least 350 atm and a temperature of at least 840° F. and that thereby at least the fuel vapor is converted into a mixture of organic gases having a chemical composition which differs from an original composition of the fuel at atmospheric conditions and having a different molecular structure as compared with that of it's original composition, the organic gases of the mixture being at least partly volatile under atmospheric conditions.

By increasing the high pressure of the pump to at least 350 atm and providing a heat supply for the fuel-vapor-water-vapor-mixture in the evaporator, to heat the fuel-vapor-water-vapor-mixture to preferably above 840° F., a chemical conversion of the fuel-vapor-water-vapor-mixture into mixed components with a different molecular structure than fuel in it's solid or liquid original state, is reached. The vaporized components are at least partly converted into gases, which maintain their gaseous state of aggregation also under standard atmospheric conditions. The energy content of the pressurized gas mixture or gas vapor mixture in the cylinder is increased by the decomposition of large molecules of the mixed components into a variety of different compounds with smaller molecular structure. The higher thermodynamic efficiency of the superheated high pressure fuel-vapor-water-vapor-mixtures increases overall efficiency of the engine by at least five to eight percent.

The method of the invention can be used either in combustion engines with auto-ignition or positive ignition. It is to be understood that during starting of the engine, pure fuel is injected. Additional ignition means during warming up can be advantageous. After reaching the operation condition the supply of superheated, high-pressurized fuel-vapor-water-vapor-mixture is started.

According to a further feature of the invention the fuel vapor is at least partly gained from a solid matter slurry.

Another object of the invention is to provide an internal combustion engine comprising at least one combustion chamber, air inlet and gas exhaust valves, an exhaust pipe, at least one injection valve, pump means for pumping a mixture of liquid fuel and water to the injection valve and evaporating means for evaporating the mixture prior to it's arrival at the injection valve. The evaporating means is in heat exchange with the exhaust pipe, and the pump means comprise a fuel metering pump and a water metering pump. A mixing chamber is connected to both pumps for mixing fuel and water, a high-pressure pump is connected to the mixing chamber for pumping the liquid mixture to a pressure of at least 350 atm, and the high-pressure pump is connected to the evaporating means for evaporating and super-heating the liquid mixture to at least 840° F. to form a gas mixture at the injection valve having a different molecular structure as compared with that of the liquid mixture in the mixing chamber.

The fuels usable according to the invention do not have to be necessarily diesel oils, because the new method allows utilization of various liquid or solid fuels instead of diesel oils or together therewith to the high-pressure pump. Vegetable oils, ollifarous colors, waste oils, lubricating oils and the like can be utilized as well as solid powders, especially wood flour, powdered coal and pulverized synthetid waste. The solid matters are worked up to a slurry, which then is supplied to the high-pressure pump by a metering pump.

Especially advantageous are combustible matters, which can be cracked to organic basic modules or units, especially HC, by high pressure and high temperature. Due to the inventive method the energy content utilization of these combustible matters is greatly improved.

Controlling of the injection valve is based on common techniques depending on the demand of energy. The control of the metering pumps to achieve the fuel water mixture uses a computer to compute the energy content of the combustible matters per unit and the referring volume rate to adjust the respective metering pump correctly.

The method is preferably used in connection with valve-controlled combustion engines, but in principle can also be used for two-cycle engines.

It is to be understood that the efficiency of the combustion engine process is increasing according to the temperature rise of the vapor-gas-mixture and if need be, is enriched by solid particles when arriving at the cylinder. If the size of the heat-exchanger is sufficient, a temperature of the vapor-gas-mixture at the injection valve of above 840° F. can be reached. Even temperatures above 950° F. are possible. At these temperatures the usual cylinders, pistons and valves must be exchanged with heat-resistant components.

BRIEF DESCRIPTION OF THE DRAWING

The drawing is a diagrammatic view of a preferred embodiment of the invention, showing the components of an internal combustion engine.

DETAILED DESCRIPTION OF A PREFERRED EMBODIMENT

An internal combustion engine 10 includes a cylinder head with an air inlet valve system 12, which can comprise a variety of valves and is connected to an air inlet manifold 14 comprising a turbocharger 16 driven by an exhaust gas turbine 18. An exhaust valve system 20 which can have one or more single valves, leads hot exhaust gases of about 1300° F. into an exhaust gas system 22, which comprises the exhaust gas turbine 18. The exhaust gas system or conduit 22 preferably comprises a condenser (not shown) for recovering of water and a cyclone filter. The internal combustion engine 10 described thus far is of known structure.

The new engine proposes schematically shown supply containers 24, 26 and 28 for diesel oil, water and recycled water condensate and a slurry made from pulverized burnables. Each one of the supply containers 24, 26 and 28 is connected to a metering pump. The pumps 30 are computer-controlled to adjust the flow rates to achieve a mixture of predetermined composition. The metering pumps 30 pump the mixture of liquids and/or solid matter to a high-pressure pump 32 via a mixing chamber 31, which provides a mixture of sufficient homogeneity. The high-pressure pump 32 increases the mixture's pressure to about 350 atm. The mixture then is transported through a heat exchanger 34 incorporated in the exhaust gas system 22. In the heat exchanger 34 the mixture is evaporated and at least partly converted into gases at a temperature of at least 840° F. In this super-heated state a molecular conversion of the fuel-vapor-water-vapor-mixture takes place, which results in new gaseous components with especially smaller molecular structure. These gases at least partly after relaxation remain gaseous under standard atmospheric conditions. The components of the super-heated high-pressure gas and/or vapor mixture at least partly become thermally dissociated. The mixture then is injected into the combustion chamber by an injection valve 36, which is controlled mechanically, hydraulically or electrically.

During starting of the engine the metering pumps 30 for water and slurry of solid matters are inactive. Only the metering pump 30 for diesel oil supplies the high-pressure pump 32. The oil is injected in liquid state into the combustion chamber via the injection valve 36. After a short time of operation the heat exchanger 34 is able to evaporate and/or gasify the oil provided by the high-pressure pump 32. As soon as the exhaust gas temperature in the heat exchanger 34 is sufficiently high, the operation phase starts and the metering pump 30 for the water container 26 is activated, whereby a determined mixing relation of oil and water is maintained. At the same time the pump 30 for the solid matter slurry container 28 can be activated and the flow rate of the pump 30 for the oil supply 24 is reduced correspondingly. The pump 30 for the oil container can also be switched off completely, so that the solid matter slurry is the sole combustible means.

It is to be understood that the supply container station can have additional supply containers with respective metering pumps 30 to store other energy containing liquid or slurry-type waste materials. It is important that each supply container comprises an own metering valve, because the average energy content of each stored material has to be determined and depending on this value the pump has to feed an exactly metered quantity of the material as a mixing component per unit time.

Instead of using one metering pump 30 for each one of the supply containers 24, 26, 28 one or more metering pumps can be replaced by a remote-control valve.

I claim:

1. A method for operating an internal combustion engine including at least one combustion chamber with an air inlet valve, a gas exhaust valve and an injection valve, the method comprising:

supplying air through the air inlet valve and fuel through the injection valve to create hot exhaust gas at the gas exhaust valve;

forming a mixture of fuel vapor and water vapor;

heating the mixture using heat from the hot exhaust gas to a temperature of at least 840° F. and supplying the mixture at a pressure of at least 350 atm to the injection valve for supply to the combustion chamber, the heat and pressure of the mixture converting the fuel vapor into a mixture of organic gases having a chemical composition which differs from an original composition of the fuel vapor at atmospheric conditions, the converted fuel vapor having a different molecular structure compared with the original composition, organic gases in the converted fuel vapor being at least partly volatile under atmospheric conditions.

2. A method according to claim 1, including supplying at least some of the fuel vapor from a solid matter slurry.

3. An internal combustion engine comprising:

at least one combustion chamber having an air inlet valve, a gas exhaust valve and an exhaust gas conduit;

at least one injection valve connected to the combustion chamber for injecting a mixture into the combustion chamber;

pump means for pumping a mixture of liquid fuel and water;

heat exchange means connected to the pump means and to the exhaust gas conduit for heating a mixture of liquid fuel and water pumped by the pump means to a temperature of at least 840° F.;

the pump means comprising a fuel metering pump, a water metering pump and a mixing chamber connected to the fuel metering pump and the water metering pump for mixing fuel and water, and a high-pressure pump connected to the mixing chamber for pumping the mixture to the injection valve at a pressure of at least 350 atm, the pressure and heat of the mixture causing fuel in the mixture to have different molecular structure compared to fuel in the liquid mixture in the mixing chamber.

4. An internal combustion engine according to claim 3, including means for pumping a combustible fuel slurry to the mixing chamber to form part of the liquid mixture.

* * * * *